E. W. CLEVELAND.
MULTIPLE SPINDLE DRILL HEAD.
APPLICATION FILED MAR. 26, 1915.
1,146,768.
Patented July 13, 1915.
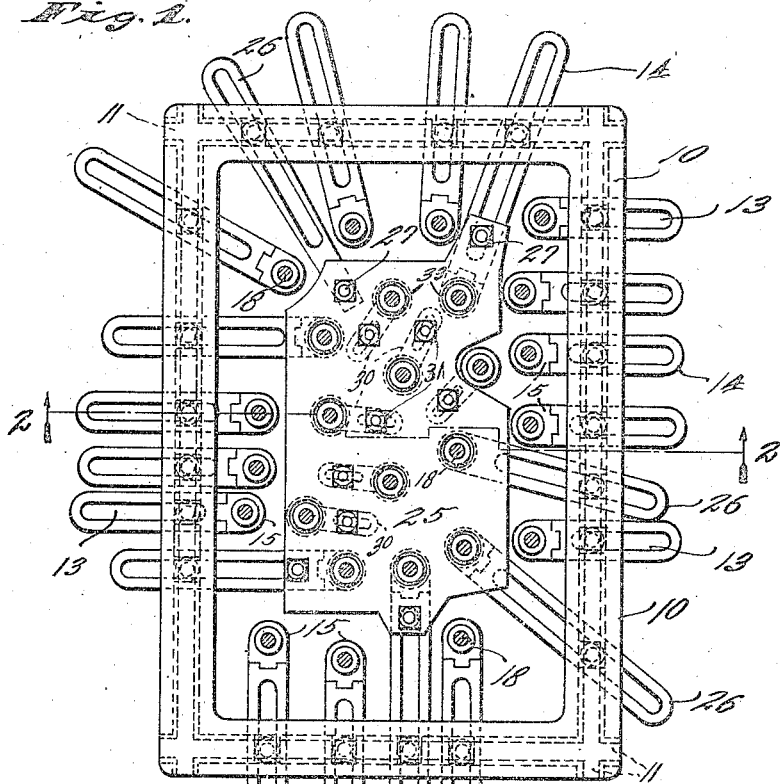
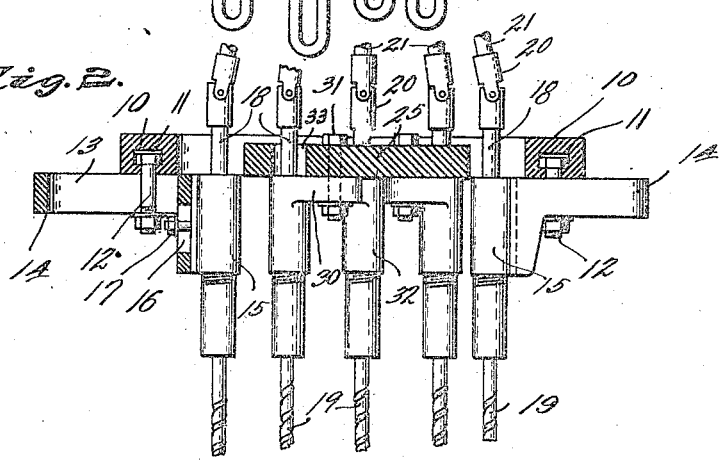
WITNESSES:
INVENTOR
Edgar W. Cleveland,
BY
Hood & Ashby
ATTORNEYS

UNITED STATES PATENT OFFICE.

EDGAR W. CLEVELAND, OF RICHMOND, INDIANA, ASSIGNOR TO NATIONAL AUTOMATIC TOOL COMPANY, OF RICHMOND, INDIANA, A CORPORATION OF INDIANA.

MULTIPLE-SPINDLE DRILL-HEAD.

1,146,768.

Specification of Letters Patent.

Patented July 13, 1915.

Application filed March 26, 1915. Serial No. 17,110.

*To all whom it may concern:*

Be it known that I, EDGAR W. CLEVELAND, a citizen of the United States, residing at Richmond, in the county of Wayne and State of Indiana, have invented a new and useful Multiple-Spindle Drill-Head, of which the following is a specification.

It is the object of my invention to provide a multiple spindle drill head which will permit a greater number of spindles to be used in a given space, and these spindles to be relatively adjustable.

In carrying out my invention, I provide a usual form of multiple spindle drill head with adjustable arms thereon for supporting various spindles, and provide a supplemental plate which is adjustably supported from the main drill head and is provided with additional adjustable arms for supporting more spindles, the main drill head usually being in the form of a hollow rectangle and the supplemental plate being within such rectangle.

The accompanying drawing illustrates my invention.

Figure 1 is a plan view of a drill head embodying my invention, showing the various spindles in section; and Fig. 2 is a section on the line 2—2 of Fig. 1.

The main drill head 10 is in the form of a hollow rectangle which on its lower side is provided with a groove 11 for receiving the heads of bolts 12 which extends through slots 13 in arms 14 for clamping such arms against the under side of the head 10 in any desired position, and the arms 14 at their inner ends are provided with bearings 15 which may be vertically adjustable in slots 16 in the inner ends of the arms 14 in such case being provided with clamping bolts 17 for holding them in adjustable position. Within the bearings 15 are the spindles 18 of the drills 19, these spindles being connected by universal joints 20 to their driving shafts 21 in the usual manner.

Sometimes it is impossible, for lack of space, to mount a sufficient number of arms 14 on the head 10 to get the required number of drills 19. In such cases I provide a supplemental plate 25, located within the hollow rectangular head 10 and supported therefrom either by some of the arms 14 or by supplemental arms 26, the arms 26 being adjustably attached to the under side of the rectangular head 10 in the same manner as are the arms 14 and the arms 14 and 26 which support the plate 25 being provided with clamping bolts 27 by which at or near their inner ends they are clamped to the plate 25. Mounted on the under side of the plate 25 are a number of arms 30, which are attached to the plate 25 by clamping bolts 31 which permit them to be adjusted as required, these arms 30 being slotted to receive the bolts 31 as is clear from Fig. 1. The arms 30 at their free ends are provided with bearings 32, which are like the bearings 15 and also support spindles 18 of additional drills 19, these spindles 18 passing through holes 33 in the plate 25. The holes 33 are sufficiently larger than the drills 18 so as to permit of the necessary adjustment of the arms 30 to produce proper positioning of the drills 19. By the use of this plate 25 and the arms 30 thereon, a greater number of drills can be gotten into a given space than when merely the head 10 and its arms 14 are used.

I claim as my invention:

1. A multiple spindle drill head, comprising a hollow main drill head, arms adjustably mounted thereon, a supplemental plate carried by some of said arms, said plate being provided with holes for drill spindles, supplemental arms adjustably mounted on said supplemental plate, said supplemental arms and arms on the main drill head being provided with bearings for drill spindles.

2. A multiple spindle drill head, comprising a main drill head, a plurality of arms adjustably mounted on said main drill head, a supplemental plate carried by some of said arms, and bearings carried by arms on the main drill head and by said supplemental plate for receiving the drill spindles, the bearings mounted on said supplemental plate being adjustable relatively thereto and said supplemental plate being provided with holes for allowing the passage of the associated drill spindles and the adjustment of said spindles in such holes.

3. A multiple spindle drill head, comprising a main drill head, a plurality of arms adjustably mounted on said main drill head, a supplemental plate carried by some of said arms, and bearings carried by arms on the main drill head and by said supplemental plate for receiving the spindles.

In witness whereof, I EDGAR W. CLEVELAND have hereunto set my hand at Richmond, Indiana, this 12th day of March, A. D. one thousand nine hundred and fifteen.

EDGAR W. CLEVELAND.

Witnesses:
ROYDEN E. PARKE,
LOUIS F. FULLER.